United States Patent [19]

Michel

[11] Patent Number: 4,643,308
[45] Date of Patent: Feb. 17, 1987

[54] SHIELDED DISKETTE CASE

[75] Inventor: Thomas J. Michel, Miami, Fla.

[73] Assignee: Data Medi-Card, Inc., Lake Worth, Fla.

[21] Appl. No.: 826,309

[22] Filed: Feb. 5, 1986

[51] Int. Cl.[4] .................. B65D 85/57; B65D 47/24
[52] U.S. Cl. ............................... 206/444; 206/454; 220/335
[58] Field of Search ............... 206/444, 454; 220/335

[56] References Cited

U.S. PATENT DOCUMENTS

| 3,511,990 | 5/1970 | Hauss | 206/454 |
|---|---|---|---|
| 4,143,763 | 3/1979 | Haglund | 206/454 |
| 4,238,030 | 12/1980 | Maylandt | 206/444 |
| 4,293,070 | 10/1981 | Ohlbach | 206/444 |
| 4,308,972 | 1/1982 | McReynolds et al. | 220/335 |
| 4,325,595 | 4/1982 | Solomon | 220/335 |
| 4,345,697 | 8/1982 | Wilson et al. | 220/335 |
| 4,346,810 | 8/1982 | Kneissl | 220/335 |
| 4,438,164 | 3/1984 | Pfeifer et al. | 206/454 |
| 4,557,382 | 12/1985 | Johnson | 206/444 |

Primary Examiner—Joseph Man-Fu Moy
Attorney, Agent, or Firm—Michael Ebert

[57] ABSTRACT

An easily-opened case for housing diskettes having data magnetically recorded thereon. The case not only acts to protect the diskettes from contamination and physical injury but also shields it from stray magnetic fields, electrostatic discharges and from ionizing radiation which, if the diskettes were exposed thereto, would act to erase or distort the data recorded thereon. The case is formed of a box adapted to house the diskettes and a cover to the rear of the box. The box and its cover are fabricated of aluminum or other material having shielding properties with respect to stray fields, electrostatic discharges and ionizing radiation. The cover is provided with front and side flanges which when the cover is closed lie against the front and side walls of the box, and with an outwardly inclined rear baffle which when the cover is closed assumes about a 45 degree angle with respect to the rear wall of the box, whereby when the cover is raised, the rear baffle then lies against the rear wall of the box. Because of this arrangement, the junctions between the upper edges of the box and the cover which exist when the box is closed are shielded by the cover flanges and baffle.

6 Claims, 4 Drawing Figures

SHIELDED DISKETTE CASE

BACKGROUND OF INVENTION

1. Field of Invention

This invention relates generally to cases for housing diskettes having data magnetically recorded thereon; and in particular to a case which serves not only to physically protect the diskette housed therein but also functions to shield the diskettes from stray magnetic fields, electrostatic discharges, and from ionizing radiation that, in the absence of shielding, would erase or distort the recorded data.

2. Status of Prior Art

Floppy discs, also known as diskettes, are now the most widely used secondary memory for microcomputers having a random-access capability. The name "floppy disc" is derived from the magnetic recording medium itself, which is an oxidecoated flexible disc of polyester material similar to but more flexible than a plastic 45 RPM phono record. Electronic data is magnetically recorded in concentric tracks on magnetic coatings on both sides of the disc.

Most diskettes are 8 inches in diameter and are housed in a thin plastic envelope that remains stationary when a drive unit spins the disc. Also commercially available are mini-diskettes having a diameter of about 5 inches.

It is known to store and transport floppy discs or diskettes in low-cost plastic boxes which protect the diskette from moisture and surface contamination and also from physical displacement or bending that might cause cracking of the magnetic coatings on the surface of the polyester substrate. However, such plastic boxes fail to protect the diskette from non-physical damages resulting from exposure of the diskette to stray magnetic fields, electrostatic discharges and ionizing radiation.

The effect of a stray magnetic field on a diskette depends on its strength. Thus, if the magnetic field is fairly weak, it may erase or scramble a few bytes of data recorded on the diskette, thereby making recovery of the data difficult. With stronger magnetic fields in the proximity of the diskette, entire tracks of data may be lost.

Thus, if a diskette lies in close proximity to a microdictating machine, the permanent magnet in the speaker of this machine can propagate a strong enough field to cause a loss of data in the diskette. This could happen, for example, where an executive carries both a diskette and a microdictating machine in his briefcase. Also, simply laying a diskette next to a standard telephone may cause erasure of data because of magnetic fields generated by the telephone ringer, transmitter and receiver.

Stray magnetic fields are pervasive and exist in the vicinity of motors, computers and various types of hardware and instruments which include electromagnetic or permanent magnet components. Hence, one who transports a boxed diskette or stores it at home, in a factory or other facility, may, without being aware of the hazard, expose the diskette to stray magnetic fields of sufficient strength to erase, scramble or distort data recorded thereon.

Electrostatic spark discharges can also be damaging to diskettes. Such electrostatic discharges are quite common in the winter in the north, and represent a real problem to those who handle magnetic media. Thus, an electrostatic discharge can literally, in some cases, burn a hole in the magnetic medium of a diskette. This not only creates a void in the magnetic medium resulting in data error, but it also contaminates the burn site; and when the diskette is driven to be read, this in turn contaminates the read head.

Apart from the potential of an actual burn, an electrostatic spark discharge can cause data on the disc to become scrambled. Electrostatic discharges create a problem, not so much by erasing a whole diskette, but only small portions of the data. This makes the system appear to be running normally though it contains buried errors. Hence, the adverse effects of magnetic fields on a diskette are more dramatic than those produced by electrostatic discharges, but that does not mean that the effects of such discharges are insignificant.

X-rays and other forms of ionizing radiation, such as alpha and beta particle radiation can be damaging to diskettes exposed thereto, for such radiation acts to erase data bytes on the magnetic medium. Such erasure arises from energy transformation which changes the magnetic orientation of the magnetic particles in the medium to create false codes or randomized errors on the diskette. Thus, when a diskette is contained in luggage going through an X-ray frisking unit in an airport, it will then be exposed to X-radiation with a resultant loss of data. And when a diskette is in the proximity of a device generating microwave energy, it can be adversely affected thereby.

Briefly stated, these objects are attained in an easily-opened case for housing diskettes having data magnetically recorded thereon. The case not only acts to protect the diskettes from contamination and physical injury but also shields it from stray magnetic fields, electrostatic discharges and from ionizing radiation which, if the diskettes were exposed thereto, would act to erase or distort the data recorded thereon. The case is formed of a box adapted to house the diskettes and a cover to the rear of the box. The box and its cover are fabricated of aluminum or other material having shielding properties with respect to stray fields, electrostatic discharges and ionizing radiation. The cover is provided with front and side flanges which when the cover is closed lie against the front and side walls of the box, and with an outwardly inclined rear baffle which when the cover is closed assumes about a 45 degree angle with respect to the rear wall of the box, whereby when the cover is raised, the rear baffle then lies against the rear wall of the box. Because of this arrangement, the junctions between the upper edges of the box and the cover which exist when the box is closed are shielded by the cover flanges and baffle.

OUTLINE OF DRAWING

For a better understanding of the invention as well as other objects and further features thereof, reference is made to the following detailed description to be read in conjunction with the accompanying drawings, wherein.

DESCRIPTION OF INVENTION

Figure 1:
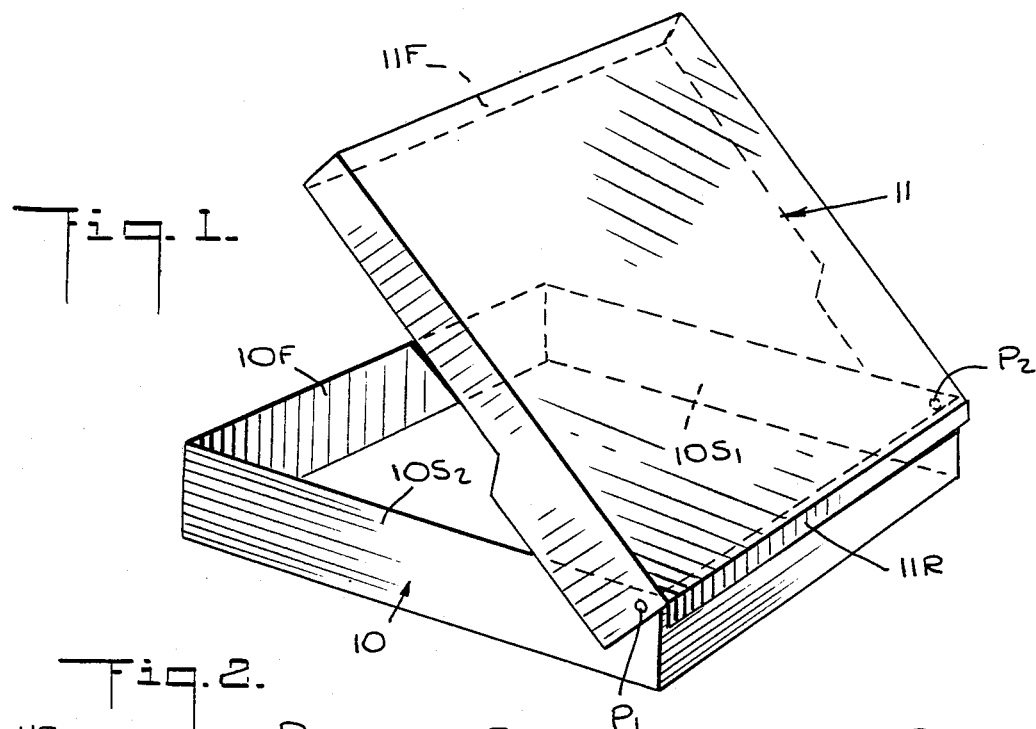
FIG. 1 is a perspective view of a case in accordance with the invention which is illustrated in its open and empty state.

Referring now to the figures of the drawing, there is shown a protective case in accordance with the invention for housing a stack of diskettes D and for shielding these diskettes from stray magnetic fields, electrostatic discharges and ionizing radiation to prevent erasure or distortion of the data magnetically recorded on the diskettes.

The case is constituted by a square box 10 having a cover 11 hinged thereto adjacent the upper rear corners of the box so that the case is easily opened and closed for convenience in handling. Users of diskettes usually object to cases which have latched covers or doors that are difficult to open without fumbling. A case in accordance with the invention avoids this problem, for it is without any lock, it is easily opened, yet when shut remains closed.

Figure 3:
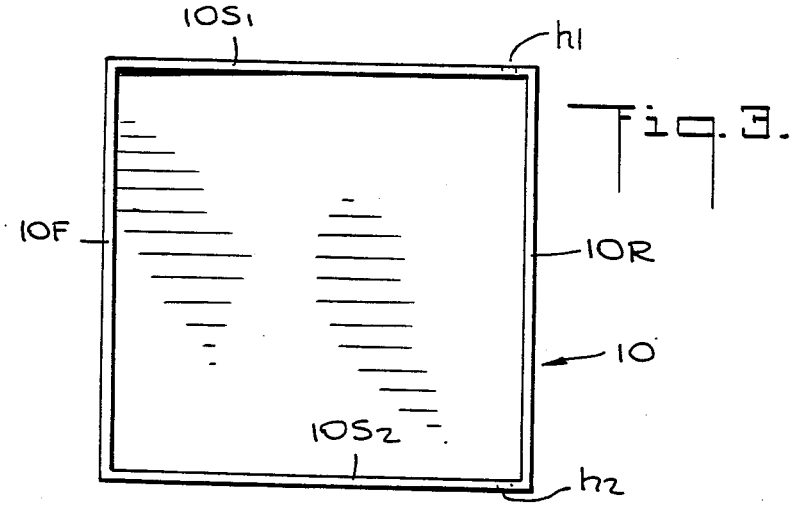
FIG. 3 is a plan view of the box of the case.
Figure 4:
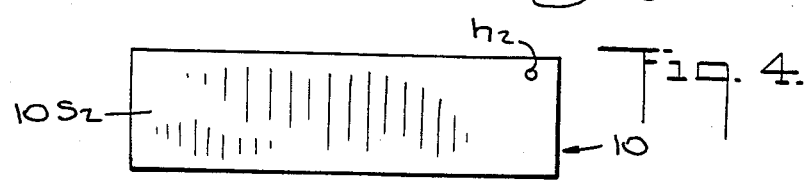
FIG. 4 is a side view of the box.

Box 10, as shown in FIGS. 1 and 3, is defined by front and rear walls 10F and 10R and side walls $10S_1$ and $10S_2$. The box is provided with holes $h_1$ and $h_2$ adjacent the upper edges of the side walls at the rear corners. Pivot pins $p_1$ and $p_2$ are inserted in these holes to hinge cover 11 to the box. In practice, when the box is designed for mini-diskettes having about a 5-inch diameter, the square box will then have sides slightly greater than 5 inches.

Cover 11 is provided with a front flange 11F and side flanges $11S_1$ and $11S_2$ which, when the case is closed, lie against the corresponding front wall 10F and side walls $10S_1$ and $10S_2$ of the box. Cover 11 also includes an outwardly inclined rear baffle 11R which, when the cover is raised as shown in FIG. 1, the baffle then lies against the rear wall 10R of the box, and when the cover is closed, it is angled from rear wall 10R at about 45 degrees therefrom.

The box and cover are fabricated of a paramagnetic material such as aluminum which provides both electromagnetic and electrostatic shielding. It is well known that the lower the frequency of a magnetic field, the greater its depth of penetration into the shielding material. For aluminum at 100 kHz, the depth of penetration is 0.010 in. Hence, when the case is made of aluminum having a thickness of about 0.025 to 0.30 inches, the case is substantially impervious to stray magnetic fields, even those of low frequency. And the aluminum case acts as a Faraday cage which cannot be penetrated by electrostatic discharges.

With respect to ionizing radiation emanating from an X-ray or other source, aluminum, while not as radiation opaque as a lead barrier, is an effective shield, for it will, in the case of X-rays, so attenuate the X-rays as to render them innocuous in regard to the magnetic medium of the diskettes.

Figure 2:
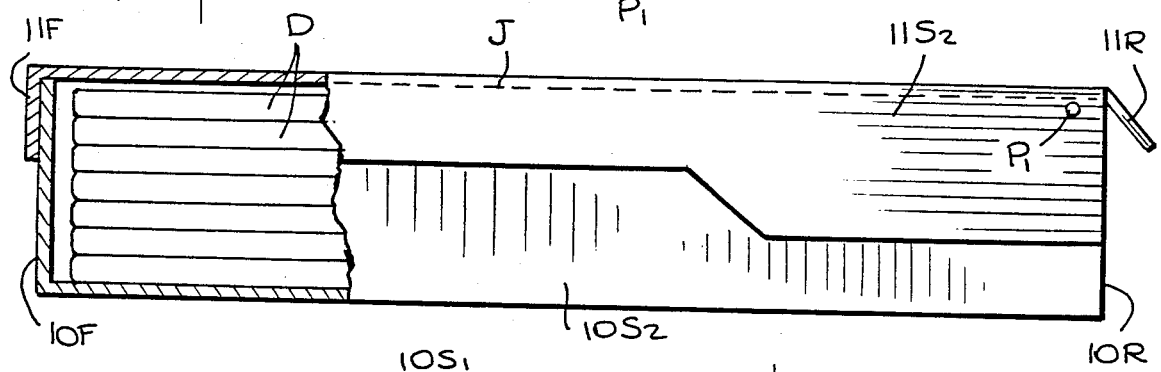
FIG. 2 is a side view of the case in its closed state, the case being partially cut away to expose a stack of diskettes housed therein.

The flanges and baffle on the cover perform an important shielding function; for in the absence thereof, the junction line J between the upper edges of box 10 and cover 11 resting on these edges, as shown in FIG. 2, would represent a leakage path, and would permit some penetration of magnetic and electrostatic fields as well as ionizing radiation. However, leakage through these junctions is blocked by the flanges and the baffle of the cover.

The fact that baffle 11R of the cover does not lie against the rear junction but is angled therefrom when the box is closed does not render it ineffective, for radiation and lines of flux travel in substantially straight lines and these are blocked by the baffle. The angle of the baffle is necessary to permit the hinged cover to be raised.

In practice, a spring may be provided at the hinge which is so biased as to normally hold the cover in its raised position. In this arrangement, the front flange 11F is provided with a releasable detent that is received in a complementary indentation in the front wall 10F of the box.

The case will, of course, in addition to its shielding function also protect the diskettes stored therein from physical damage and contamination.

While there has been shown and described a preferred embodiment of a shielded diskette case in accordance with the invention, it will be appreciated that many changes and modifications may be made therein without, however, departing from the essential spirit thereof. Thus, instead of an aluminum case, the box and cover thereof may be molded of synthetic plastic material whose inner and outer surfaces are aluminized as by vacuum deposition to define both inner and outer metallized layers acting as a double shield. Or the case may be made of a high permeability metal laminate.

I claim:

1. A case for protectively housing diskettes having data magnetically recorded thereon, the case also acting to shield the diskettes from stray magnetic fields, electrostatic discharges and ionizing radiation, said case comprising:

A a box adapted to house the diskettes; and

B a cover hinged to the rear of the box, the cover being provided with front and side flanges which, when the cover is closed, lie against the corresponding walls of the box, and with an outwardly inclined rear baffle which, when the cover is open, lies against the rear wall of the box, and when the cover is closed is angled with respect to said rear wall to permit the cover to swing open, said box and said cover including said flanges and said baffle being formed of a paramagnetic metallic material which is not substantially penetrated by said stray magnetic fields, electrostatic discharges and ionizing radiation, the angle assumed by the baffle when the cover is closed being such as to prevent penetration into said box, whereby the diskettes housed in the box are fully shielded.

2. A case as set forth in claim 1, wherein said diskettes have a diameter of about 5 inches and said box is a square, each side of which is slightly greater than 5 inches.

3. A case as set forth in claim 1, wherein said box is provided adjacent the upper edges of the side walls at the rear thereof with holes to receive pivot pins for hinging the cover to the box.

4. A case as set forth in claim 1, wherein said box and cover are fabricated of aluminum.

5. A case as set forth in claim 1, wherein said baffle forms about a 45 degree angle with respect to the rear wall of the box when the cover is closed.

6. A case as set forth in claim 1, wherein said box and cover are fabricated of a high permeability metal laminate.

* * * * *